United States Patent
Lund

(10) Patent No.: US 12,458,687 B2
(45) Date of Patent: Nov. 4, 2025

(54) WOUND DEBRIDEMENT SYSTEMS

(71) Applicant: Regenics AS, Oslo (NO)

(72) Inventor: Henrik Lund, Oslo (NO)

(73) Assignee: Regenics AS, Oslo (NO)

( * ) Notice: Subject to any disclaimer, the term of this patent is extended or adjusted under 35 U.S.C. 154(b) by 838 days.

(21) Appl. No.: 17/624,144

(22) PCT Filed: Jul. 6, 2020

(86) PCT No.: PCT/US2020/040865
§ 371 (c)(1),
(2) Date: Dec. 30, 2021

(87) PCT Pub. No.: WO2021/007147
PCT Pub. Date: Jan. 14, 2021

(65) Prior Publication Data
US 2022/0347273 A1   Nov. 3, 2022

Related U.S. Application Data

(60) Provisional application No. 62/870,956, filed on Jul. 5, 2019.

(51) Int. Cl.
*A61K 38/48* (2006.01)
*A61K 8/66* (2006.01)
*A61K 35/60* (2006.01)
*A61Q 19/00* (2006.01)
*A61Q 19/02* (2006.01)

(52) U.S. Cl.
CPC ............ *A61K 38/4886* (2013.01); *A61K 8/66* (2013.01); *A61K 35/60* (2013.01); *A61Q 19/007* (2013.01); *A61Q 19/02* (2013.01); *C12Y 304/24066* (2013.01); *C12Y 304/24067* (2013.01)

(58) Field of Classification Search
CPC ...... A61K 38/4886; A61K 8/66; A61K 35/60; A61Q 19/007; A61Q 19/02; C12Y 304/24066; C12Y 304/24067
See application file for complete search history.

(56) References Cited

U.S. PATENT DOCUMENTS 9,999,639 B2 * 6/2018 Gammelsaeter ....... A61K 35/60
10,155,061 B2 * 12/2018 Shi ..................... A61K 38/4886
(Continued)

FOREIGN PATENT DOCUMENTS

| WO | 2011/064384 | 6/2011 |
| WO | 2011/071986 | 6/2011 |
| WO | WO 2014/094918 | 6/2014 |

(Continued)

OTHER PUBLICATIONS

Nguyen et al., "Roles of Matrix Matalloproteinases in Cutaneous Wound Healing," in Wound Healing, New insights into Ancient Challenges, 2016. (Year: 2016).*
Inohaya et al., "Temporal and Spatial Patterns of Gene Expression for the Hatching Enzyme in the Teleost Embryo, *Oryzias latipes*," in developmental Biology 171, 374-385 (1995) (submitted as exhibit in the response filed Jun. 19, 2025). (Year: 1995).*

(Continued)

*Primary Examiner* — Blessing M Fubara
(74) *Attorney, Agent, or Firm* — Casimir Jones, S.C.; J. Mitchell Jones

(57) ABSTRACT

The present invention provides compositions and methods for wound debridement and healing. The debridement compositions preferably comprise a metalloprotease enzyme such as a choriolytic enzyme.

17 Claims, 3 Drawing Sheets

Specification includes a Sequence Listing.

(56) References Cited

U.S. PATENT DOCUMENTS

2009/0274770 A1    11/2009   Gammelsaeter et al.
2012/0309689 A1*   12/2012   Leren .................. C12N 9/6416
                                                                              435/325

FOREIGN PATENT DOCUMENTS

WO      WO-2014094918 A1 *   6/2014    ........... A61K 35/60
WO      WO 2018/207036       11/2018
WO      WO-2018207036 A1 *   11/2018   .............. A61K 8/64

OTHER PUBLICATIONS

Musialak et al., Embryonic development and sensitive stages of Atlantic salmon (*Salmo salar*) eggs in Aquaculture 579 (2024) 740281 (submitted as exhibit in the response filed Jun. 19, 2025). (Year: 2024).*

European Patent Office, Extended European Search Report for EP Application No. 20836324.2 mailed Jul. 7, 2023.

National Center for Biotechnology Information; Low choriolytic enzyme-like [Oncorhynchus mykiss], NCBI Reference Sequence: XP_021437192.1 Genbank entry [online]. National Institute of Health. Jun. 27, 2017; pp. 1-2.

International Search Report and Written Opinion for PCT/US2020/40865, mailed Oct. 15, 2020; 16 pages.

Remington's Pharmaceutical Sciences, 18th Edition, Mack Publishing, p. 1288-1300 [1990].

\* cited by examiner

WOUND DEBRIDEMENT SYSTEMS

FIELD OF THE INVENTION

The present invention provides compositions and methods for wound debridement and healing.

BACKGROUND OF THE INVENTION

Chronic wounds represent a significant burden to patients, health care professionals, and the US health care system, affecting 5.7 million patients and costing an estimated 20 billion dollars annually.

Chronic wounds are rarely seen in individuals who are otherwise healthy. In fact, chronic wound patients frequently suffer from "highly branded" diseases such as diabetes and obesity. Chronic wounds are those that have failed to proceed through an orderly and timely reparative process to produce anatomic and functional integrity of the injured site. Often disguised as a comorbid condition, chronic wounds represent a silent epidemic that affects a large fraction of the world population and poses major and gathering threat to the public health and economy of the United States. In developed countries, it has been estimated that 1 to 2% of the population will experience a chronic wound during their lifetime. In the United States alone, chronic wounds affect 6.5 million patients. In the Scandinavian countries, the associated costs account for 2-4% of the total health care expenses.

The burden of treating chronic wounds is growing rapidly due to increasing health care costs, an aging population and, in the United States and beyond, a sharp rise in the incidence of diabetes and obesity worldwide. It is claimed that an excess of US$25 billion is spent annually on treatment of chronic wounds. To that add the rapidly expanding need for wound care of our veterans, and the need to prioritize wound care and research would appear to be compelling. At present, over 1000 outpatient wound centers are in operation in the United States, not including all the wound care rendered by clinicians in their offices, by inpatient acute care hospitals, long term facilities and nursing homes. According to a new report by Global Industry Analysts, the annual wound care products market would reach $15.3 billion by 2010. The United States represents the world's largest and the fastest growing market. The amount of money spent on wound care, the loss of productivity for afflicted individuals and the families that care for them and their diminished quality of life come at great cost to our society.

What is needed in the art are new and effective treatments for chronic wounds.

SUMMARY OF THE INVENTION

The present invention provides compositions and methods for wound debridement and healing.

Accordingly, in some embodiments, the present invention provides methods of debriding a wound comprising contacting the wound with an effective amount of a metalloprotease.

In some preferred embodiments, the effective amount of a metalloprotease is effective to remove devitalized tissue in the wound. In some preferred embodiments, the metalloprotease is selected from the group consisting of a low choriolytic enzyme (LCE), a high choriolytic enzyme (HCE) and combinations thereof. In some preferred embodiments, the LCE is a trout LCE. In some preferred embodiments, the LCE is at least 90% identical to SEQ ID NO:1 and has LCE activity. In some preferred embodiments, the LCE activity is LCE protease activity as assayed using fluorescein isothiocyanate (FITC)-labeled casein as a substrate and wherein LCE protease activity causes an increase in fluorescence due to release of quenching of the FITC as the casein is digested into smaller peptides. In some preferred embodiments, the LCE is recombinant LCE. In some preferred embodiments, the recombinant LCE comprises a his-tag. In some preferred embodiments, the metalloprotease is provided in a matrix, bandage, wound covering, cream, gel, emulsion, ointment, spray, powder or lotion.

In some preferred embodiments, the methods further comprise the step of applying a wound healing agent to the wound after debridement. In some preferred embodiments, the wound healing agent comprises an extract of differentiable cells. In some preferred embodiments, the extract of differentiable cells is a fish egg extract. In some preferred embodiments, the fish egg extract comprises about 100 to 380 mg/ml protein in an aqueous solution; about 0.1 to 10 mg/ml RNA; and about 0.1 to 5 mg/ml DNA and 0.1-10% lipids w/w. In some preferred embodiments, the fish egg extract is heat treated by heating the extract to greater than 80° C., 90° C., 95° C. or 100° C. In some preferred embodiments, the heat treatment is from about 1 minute to about 30 minutes. In some preferred embodiments, the wound healing agent is provided in a matrix, bandage, wound covering, cream, gel, emulsion, ointment, spray, powder or lotion.

In some preferred embodiments, the wound that is treated is a chronic wound. In some preferred embodiments, the chronic wound is a diabetic ulcer.

In some preferred embodiments, the present invention provides formulations comprising a metalloprotease in an amount effective to debride a wound in a cream, gel, emulsion, ointment, spray, powder or lotion. In some preferred embodiments, the amount of metalloprotease effective to debride a wound is effective to remove devitalized tissue in a wound. In some preferred embodiments, the metalloprotease is selected from the group consisting of a low choriolytic enzyme (LCE), a high choriolytic enzyme (HCE) and combinations thereof. In some preferred embodiments, the LCE is a trout LCE. In some preferred embodiments, the LCE is at least 90% identical to SEQ ID NO:1 and has LCE activity. In some preferred embodiments, the LCE activity is LCE protease activity as assayed using fluorescein isothiocyanate (FITC)-labeled casein as a substrate and wherein LCE protease activity causes an increase in fluorescence due to release of quenching of the FITC as the casein is digested into smaller peptides. In some preferred embodiments, the LCE is recombinant LCE. In some preferred embodiments, the recombinant LCE comprises a his-tag. In some preferred embodiments, the formulation comprise urea and/or zinc chloride ($ZnCl_2$) in an aqueous solution. In some preferred embodiments, the urea is provided at a concentration of from 1 to 10 M, more preferably from 2 to 6 M, even more preferably from 3 to 5 M and most preferably about 4 M. In some preferred embodiments, the zinc chloride is provided at a concentration of from 2 to 40 mM, more preferably from 4 to 20 mM, even more preferably from 6 to 18 mM, and most preferably from 8 to 18 mM.

In some preferred embodiments, the present invention provides kits or systems for treating a wound comprising: a first container comprising a metalloprotease in an amount effective to remove devitalized tissue from a wound; and a second container comprising a wound healing agent. In some preferred embodiments, the metalloprotease is selected from the group consisting of a low choriolytic enzyme (LCE), a high choriolytic enzyme (HCE) and combinations thereof. In some preferred embodiments, the LCE is a trout LCE. In some preferred embodiments, the LCE is at least 90% identical to SEQ ID NO:1 and has LCE activity. In some preferred embodiments, the LCE activity is LCE protease activity as assayed using fluorescein isothiocyanate (FITC)-labeled casein as a substrate and wherein LCE protease activity causes an increase in fluorescence due to release of quenching of the FITC as the casein is digested into smaller peptides. In some preferred embodiments, the LCE is recombinant LCE. In some preferred embodiments, the recombinant LCE comprises a his-tag. In some preferred embodiments, the metalloprotease is provided in a matrix, bandage, wound covering, cream, gel, emulsion, ointment, spray, powder or lotion. In some preferred embodiments, the wound healing agent comprises an extract of differentiable cells. In some preferred embodiments, the extract of differentiable cells is a fish egg extract. In some preferred embodiments, the fish egg extract comprises about 100 to 380 mg/ml protein in an aqueous solution; about 0.1 to 10 mg/ml RNA; and about 0.1 to 5 mg/ml DNA and 0.1-10% lipids w/w. In some preferred embodiments, the fish egg extract is heat treated by heating the extract to greater than 80° C., 90° C., 95° C. or 100° C. In some preferred embodiments, the heat treatment is from about 1 minute to about 30 minutes. In some preferred embodiments, the wound healing agent is provided in a matrix, bandage, wound covering, cream, gel, emulsion, ointment, spray, powder or lotion.

In some preferred embodiments, the present invention provides a metalloprotease in an effective amount for use is debriding a wound. In some preferred embodiments, the effective amount of a metalloprotease is effective to remove devitalized tissue in the wound. In some preferred embodiments, the metalloprotease is selected from the group consisting of a low choriolytic enzyme (LCE), a high choriolytic enzyme (HCE) and combinations thereof. In some preferred embodiments, the LCE is a trout LCE. In some preferred embodiments, the LCE is at least 90% identical to SEQ ID NO:1 and has LCE activity. In some preferred embodiments, the LCE activity is LCE protease activity as assayed using fluorescein isothiocyanate (FITC)-labeled casein as a substrate and wherein LCE protease activity causes an increase in fluorescence due to release of quenching of the FITC as the casein is digested into smaller peptides. In some preferred embodiments, the LCE is recombinant LCE. In some preferred embodiments, the recombinant LCE comprises a his-tag. In some preferred embodiments, the metalloprotease is provided in a matrix, bandage, wound covering, cream, gel, emulsion, ointment, spray, powder or lotion.

In further preferred embodiments, the present invention provides pharmaceutical or cosmetic compositions comprising: a recombinant metalloprotease selected from the group consisting of a low choriolytic enzyme (LCE), a high choriolytic enzyme (HCE) and combinations thereof, wherein the recombinant metalloprotease exhibits metalloprotease activity in an in vitro assay. In some preferred embodiments, the LCE is a trout LCE. In some preferred embodiments, the trout LCE sequence is at least 90% identical to SEQ ID NO:1 and has LCE activity. In some preferred embodiments, the LCE activity is LCE protease activity as assayed using fluorescein isothiocyanate (FITC)-labeled casein as a substrate and wherein LCE protease activity causes an increase in fluorescence due to release of quenching of the FITC as the casein is digested into smaller peptides. In some preferred embodiments, the pharmaceutical or cosmetic compositions comprise urea and/or zinc chloride ($ZnCl_2$) in an aqueous solution. In some preferred embodiments, the urea is provided at a concentration of from 1 to 10 M, more preferably from 2 to 6 M, even more preferably from 3 to 5 M and most preferably about 4 M. In some preferred embodiments, the zinc chloride is provided at a concentration of from 2 to 40 mM, more preferably from 4 to 20 mM, even more preferably from 6 to 18 mM, and most preferably from 8 to 18 mM.

In further preferred embodiments, the present invention provides pharmaceutical or cosmetic compositions comprising: a recombinant metalloprotease selected from the group consisting of a low choriolytic enzyme (LCE), a high choriolytic enzyme (HCE) and combinations thereof; and one or more pharmaceutically or cosmetically acceptable excipients and/or diluents, wherein the composition is a gel, cream, ointment, lotion, foam, non-aqueous solution, spray, salve, stick, soap, powder, film, emulsion, suspension or dispersion and wherein the recombinant metalloprotease exhibits metalloprotease activity in an in vitro assay. In some preferred embodiments, the LCE is a trout LCE. In some preferred embodiments, the trout LCE sequence is at least 90% identical to SEQ ID NO:1 and has LCE activity. In some preferred embodiments, the pharmaceutical or cosmetic compositions comprise urea and/or zinc chloride ($ZnCl_2$) in an aqueous solution. In some preferred embodiments, the urea is provided at a concentration of from 1 to 10 M, more preferably from 2 to 6 M, even more preferably from 3 to 5 M and most preferably about 4 M. In some preferred embodiments, the zinc chloride is provided at a concentration of from 2 to 40 mM, more preferably from 4 to 20 mM, even more preferably from 6 to 18 mM, and most preferably from 8 to 18 mM.

In some preferred embodiments, the pharmaceutical or cosmetic compositions are provided for use in treating a disease or condition of the skin. In some preferred embodiments, the skin condition or disease is dry skin, hyperkeratosis, calluses, warts, liver spots, age spots, stretch marks, sunspots, brown spots, acne, eczema or psoriasis.

DEFINITIONS

Figure 1:
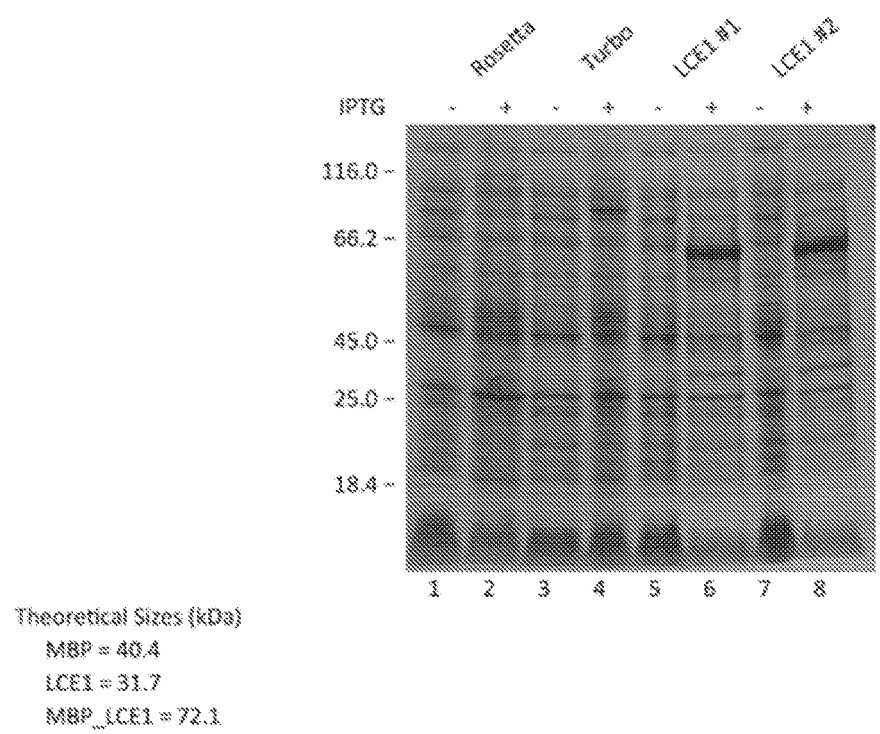
FIG. 1. Gel showing results of overexpression of LCE1 in *E. coli.*

The term "natural product" means any of a variety of organic chemical moieties whose molecular arrangement is derived from enzymatic transformations in a living organism excluding amino acids, proteins, polypeptides, nucleic acids and sequences, and saturated fatty acids. Examples include, but are not limited to lipids (i.e., that are not saturated fatty acids), carbohydrates/saccharides and polysaccharides, the steroids and their derivatives, the terpenes and their derivatives, vitamins, carotenoids, and natural medicines such as taxol, etc. The term "synthetic natural product" is a natural product not obtained from its natural source.

"Cell" means the smallest structural unit of living matter capable of functioning autonomously, consisting of one or more nuclei, cytoplasm, and various organelles, all surrounded by a semipermeable membrane. Cells include all somatic cells obtained or derived from a living or deceased animal body at any stage of development as well as germ cells, including sperm and eggs (animal reproductive body consisting of an ovum or embryo together with nutritive and protective envelopes). Included are both general categories of cells: prokaryotes and eukaryotes. The cells contemplated for use in this invention include all types of cells from all organisms in all kingdoms: plans, animals, protists, fungi, archaebacteria and eubacteria. Stem cells are cells capable, by successive divisions, of producing specialized cells on many different levels. For example, hematopoietic stem cells produce both red blood cells and white blood cells. From conception until death, humans contain stem cells, but in adults their power to differentiate is reduced.

As used herein, the term "differentiation" related to cells means the process by which cells becomes structurally and functionally specialized, which is a progressive restriction of the developmental potential and increasing specialization of function which takes place during the development of the embryo and leads to the formation of specialized cells, tissues, and organs.

The term "dedifferentiation" related to cells means the reverse process of differentiation, where cells become less structurally and functionally specialized, which increases the developmental potential of the cell.

"Differentiable" means the ability of a cell to differentiate into a desired cell type. As used herein, the term "differentiates" (differentiation) means specialization (differentiation) or return to a more primitive cell type; dedifferentiation).

An "extract" as used in the context of "cell extract" and "egg extract" in this invention means a preparation of any type of cell as defined above obtained by chemical or mechanical action, as by pressure, distillation, evaporation etc. Extracts can include all or any single component or combination of components of the cells, including concentrated preparations of the active components. Such components of the extracts include but are not limited to RNA, DNA, micro RNA, lipids, free amino acids, all amino acid base structures including peptides and proteins, carbohydrates, minerals or combinations thereof. Extracts contemplated by this invention include but are not limited to extracts of fish eggs, urchin eggs, frog eggs, adult stem cells, plant seeds and plant stem cells.

The term "manage" when used in connection with a disease or condition means to provide beneficial effects to a subject being administered with a prophylactic or therapeutic agent, which does not result in a cure of the disease. In certain embodiments, a subject is administered with one or more prophylactic or therapeutic agents to manage a disease so as to prevent the progression or worsening of the disease.

As used herein, the terms "prevent" and "preventing" include the prevention of the recurrence, spread or onset. It is not intended that the present invention be limited to complete prevention. In some embodiments, the onset is delayed, or the severity of the disease is reduced.

As used herein, the terms "treat" and "treating" are not limited to the case where the subject (e.g. patient) is cured and the disease is eradicated. Rather, the present invention also contemplates treatment that merely reduces symptoms, and/or delays disease progression.

DETAILED DESCRIPTION OF THE INVENTION

The present invention provides compositions and methods for wound debridement and healing.

The skin's two main layers are the epidermis and the dermis. The epidermis is composed up of closely packed epithelial cells, and the dermis is composed of dense, irregular connective tissue where the blood vessels, hair follicles, sweat glands, and other structures are housed. The hypodermis lies beneath the dermis. Its composition is mostly loose connective and fatty tissues. Muscle, tendons, ligaments, bone, and cartilage are all under the hypodermis. The epidermis is composed of keratinized, stratified, squamous epithelium. The dermis contains blood and lymph vessels, nerves, and other structures, such as hair follicles and sweat glands.

The indication for debridement is the removal of devitalized tissue such as necrotic tissue, slough, bioburden, biofilm, and apoptotic cells. Debridement is recognized as a major component of wound management to prepare the wound bed for reepithelialization. Devitalized tissue, in general, and necrotic tissue, in particular, serve as the source of nutrients for bacteria. Devitalized tissue also acts as a physical barrier for reepithelialization, preventing applied topical compounds to make direct contact with the wound bed to provide their beneficial properties. Necrotic tissue also prevents angiogenesis, granulation tissue formation, epidermal resurfacing, and normal extracellular matrix (ECM) formation. Finally, the presence of necrotic tissue may prevent the clinician from making an accurate assessment of the extent and severity of the wound, even masking possible underlying infections.

The present invention provides needed reagents and systems for debridement an wound healing. In some embodiments, the present invention provides metalloproteases for use in wound debridement. Preferred metalloproteases include, but are not limited to, Low Choriolytic Enzyme (LCE), High Choriolytic Enzyme (HCE), and combinations thereof. The enzymes may preferably be sourced from fish such as trout or salmon, but the present invention is not limited to those sources of enzymes. In some preferred embodiments, the enzymes are produced recombinantly. In further embodiments, the present invention provides formulations and articles that contain the metalloprotease enzyme(s) in an effective amount. The enzymes may be used alone for wound debridement, or in further preferred embodiments, the enzymes may be used in conjunction with a wound healing agent. In general, debridement is performed first and following by application of the wound healing agent. Preferred wound healing agents include, but are not limited to, extracts of differentiable cells as described in detail below. The compositions, formulations, articles and methods of the present invention may be used for treatment of any type of wound. In some embodiments, the wound is chronic wound such as a diabetic ulcer.

A. Debridement Enzymes

In preferred embodiments, the present invention provides metalloproteases for use in wound debridement. In some preferred embodiments, the metalloproteases are provided in amount effective to remove devitalized tissue from the site of a wound. The devitalized tissue may include one or all of necrotic tissue, slough, bioburden, biofilm, and apoptotic cells that are found at the site of the wound.

The present invention is not limited to the use of particular metalloprotease enzyme. Preferred metalloproteases include, but are not limited to LCE, HCE and combinations thereof. LCE and HCE are preferably sourced from fish or other marine animals such as salmonids (e.g., *Oncorhynchus mykiss* and *Salmo salar*).

Suitable LCE and HCE enzymes are identified by the sequences listed in Table 1.

TABLE 1

| Enzyme | Species | Accession Number |
|---|---|---|
| LCE | O. mykiss | XP 021437192.1 |
| LCE | O. kisutch | XP 020364193.1 |
| LCE | S. alpinus | XP 023838754.1 |
| HE (Hatching Enzyme) precursor | O. mykiss | XP 001165878.1 |
| HE | O. masou | BAI68368.1 |
| LCE | S. alpinus | XP 023823076.1 |
| LCE | O. mykiss | XP 021442762.1 |
| LCE | S. salar | XP 014070695.1 |
| LCE | M. zebra | XP 014268943.2 |
| LCE | M. zebra | BBB36255.1 |
| HCE1 | O. mykiss | XP 021457540.1 |
| HCE2 | O. mykiss | XP 021432249.1 |
| HCE1 | S. salar | XP 014044168.1 |
| HCE2 | S. salar | XP 013981100.1 |
| HCE1 | M. zebra | XP 004556362.2 |
| HCE2 | M. zebra | XP 004556363.1 |

In some embodiments, the choriolytic enzyme is at least 50%, 60%, 70%, 809%, 90%, 95%, 99% or 100% identical to a sequence listed in Table 1 with the proviso that the enzyme has choriolytic activity. In some embodiments, the choriolytic enzyme is isolated from a natural source. In some preferred embodiments, the choriolytic enzyme is recombinant. In some embodiments, the recombinant enzyme preferably comprises an additional sequence such as a his-tag that facilitates purification of the enzyme.

In some preferred embodiments, the choriolytic enzyme is O. mykiss (rainbow trout) LCE. In some embodiments the O. mykiss LCE has the following amino acid sequence (SEQ ID NO: 1):

```
mdhrpplsll lllllglsqa sgneihdeld hvsitstilv snngtnelll egdilaprtr namkcfssqy sclwrksidg lvyvpyilsa vyssleveti etsmkyfhgk tcirfiprrr qtayldiqss ggcfssmgtv gdrqtlslaq fgcvqhgiiq hellhslgfh hehnrsdrdq yirinwqyiy nyavenfqkq dtnnlntayd yssvmhydrt aftnnygket itpvpdpsva igqrqgmsdi dvlrvnklyq c
```

In some preferred embodiments, the LCE utilized in the present invention is at least 50%, 60%, 70%, 809%, 90%, 95%, 99% or 100% identical to SEQ ID NO:1 with the proviso that the enzyme has choriolytic activity. In some embodiments, LCE is isolated from a natural source. In some preferred embodiments, the LCE is recombinant. In some embodiments, the recombinant enzyme preferably comprises an additional sequence such as a his-tag that facilitates purification of the enzyme.

In some preferred embodiments, the activity of the soluble recombinant LCE (e.g., in an aqueous solution or formulation) is enhanced by formulation with urea and/or zinc chloride ($ZnCl_2$). In some preferred embodiments, the urea is provided at a concentration of from 1 to 10 M, more preferably from 2 to 6 M, even more preferably from 3 to 5 M and most preferably about 4 M. In some preferred embodiments, the zinc chloride is provided at a concentration of from 2 to 40 mM, more preferably from 4 to 20 mM, even more preferably from 6 to 18 mM, and most preferably from 8 to 18 mM.

B. Wound Healing Agents

In some embodiments, the present invention provides methods, systems and kits where a wound healing agent is provided in addition to the debridement enzyme. In some preferred embodiments, the wound healing agent is applied to the wound after debridement with the enzyme.

The present invention is not limited to the use of any particular wound healing agent. In some preferred embodiments, the wound healing agent comprises an extract from differentiable cell, such as a fish egg. In some embodiments, the egg cellular extract comprises about 100 to 380 mg/ml protein in an aqueous solution; about 0.1 to 10 mg/ml RNA; about 0.1 to 5 mg/ml DNA and 0.1-10% lipids w/w. In some preferred embodiments, the composition has an osmolarity of from about 330 to 440 mOsm, a pH of from about 5.0 to 7.7, and density of from about 0.8 to 1.4 g/ml. In some embodiments, the egg cellular extract is selected from the group consisting of an extract of an activated fish egg cellular extract and an unactivated fish egg cellular extract. In some embodiments, the fish egg cellular extract is from a fertilized egg. In some embodiments, the cellular extract is heat treated by heating the extract to greater than 80° C., 90° C., 95° C. or 100° C. In some embodiments, the heat treatment is from about 1 minute to about 30 minutes. In some embodiments, the egg cellular extract is provided in a cream, gel, emulsion, ointment, spray, powder or lotion.

As just described, the compositions of the present invention utilize cell, egg and embryo extracts from vertebrates, including but not limited to Superclass Gnathostomata (jawed vertebrates), Euteleostomi (bony vertebrates), Class Actinopterygii (ray-finned fishes), Class Sarcopterygii (lobe-finned fishes and terrestrial vertebrates), Tetrapoda (tetrapods), Amniota (amniotes), Synapsida (synapsids), Class Mammalia (mammals), Early Therapsida (early therapsids), Class Reptilia (reptiles), Anapsida (tortoises and turtles), Order Testudines (tortoises and turtles), Diapsida (birds, crocodiles, lizards, snakes, and relatives), Archosauria (birds and crocodiles), Order Crocodilia (caimans, crocodiles, and relatives), Lepidosauria (amphisbaenians, lizards, snakes, and tuataras), Order Rhynchocephalia (tuataras), Order *Squamata* (amphisbaenians, lizards, and snakes), Class *Amphibia* (amphibians), Subclass Dipnoi (lungfishes), Actinistia, Order Coelacanthiformes (coelacanths), Class Chondrichthyes (rays, sharks, and relatives), Placodermi (armored fishes and placoderms), Class Cephalaspidomorphi, more preferably fish, shrimp, sea urchin or amphibian eggs or embryos. In some embodiments, unfertilized but activated fish, shrimp, sea urchin or amphibian eggs are used. The present invention is not limited to the use of any particular types of eggs. Indeed, the use of a variety of eggs is contemplated, including, but not limited to eggs from *Xenopus*, shrimp, sea urchin, salmon, trout or zebrafish. In some embodiments, eggs are collected from mature females and spontaneously activate upon contact with water. In further embodiments, the eggs are washed in Ringer's saline. In some embodiments, the eggs are not from an avian species.

Extracts of the present invention are prepared from any of the sources described herein. In some embodiments, the extracts are cellular extracts. Cellular extracts of the present invention are preferably compositions of disrupted cells such as eggs. The cells may be disrupted by a variety of methods, including, but not limited to, mechanical shearing or blending, sonication, or osmotic lysis. In some embodiments, the cellular extracts are preferably further processed to yield a composition that is substantially free of lipids naturally associated with the cells, such as cell membrane components. By substantially free of lipids, it is meant that the cellular extract comprises less than about 1%, preferably less than about 0.5%, and more preferably less than about 0.1% of lipids that are naturally associated with the cells used to make the cellular extract. In some embodiments, the extracts comprise less than about 1% and preferably less than 0.1% cholesterol or ovalbumin. Accordingly, in some embodiments, the cellular extract comprises carbohydrates, proteins, glycosylated or otherwise modified proteins, peptides, amino acids, RNA (mRNA, sRNA, miRNA, rRNA), DNA, water etc, and combinations thereof. In some embodiments, the cellular extracts can comprise small amounts of lipids naturally associated with the cells, as well as nuclear components such as chromosomes, nucleic acids, and nuclear proteins. In some embodiments, the cellular extract is preferably a cytoplasmic extract or fraction prepared by removing nuclear, cell membrane and other water insoluble materials naturally associated with the cells. In some embodiments, these components are removed by centrifugation or fractionation of the disrupted cells. In some embodiments, the cellular extract is preferably an aqueous extract or fraction comprising water soluble cellular components such as proteins, mRNA, and carbohydrates.

A variety of methods may be used to prepare extracts. For example, in some embodiments, eggs are placed "dry" in a glass 15 ml centrifuge tube, and crushed by sedimentation at 15,000 g for 15 min. This produces three layers: a lipid top fraction, which is collected, aliquoted and frozen; a middle cellular or cytoplasmic fraction, which is also collected, aliquoted and frozen; and a pellet fraction, which is discarded. In some embodiments, the cellular fraction or extract primarily comprises contents of the cytoplasm. The cellular fraction is used as extract. In some embodiments, the cellular fraction may be used in combination with a lipid fraction. The cytoplasmic fraction may be cleared further by sedimentation at 50,000, 100,000 or 200,000 g to yield a further cellular extract which is primarily a water soluble extract fraction. Regardless of the fraction used, the extract can be diluted to about 300 mOsm with cell lysis buffer (see above), if necessary. Accordingly, in some preferred embodiment's, a water soluble extract prepared from eggs or embryos is utilized.

In other embodiments, the eggs are suspended in 0.5 volume of cell lysis buffer and sonicated on ice until all eggs are lysed. The particulate material is sedimented at 15,000 g for 15 min at 4° C. The supernatant constitutes the extract. As above, osmolarity can be adjusted to 300 mOsm if needed. The extract can also be cleared as above.

In still other embodiments, the eggs are suspended in cell lysis buffer as in method 2. Eggs are lysed by Dounce homogenization using a glass mortar and pestle (Kontes, type A or B). The lysate is sedimented and treated as described above.

In some preferred embodiments, the present invention provides compositions, either prepared from natural sources as described above or from artificial source materials, or a combination thereof. In some embodiments, the extracts are characterized as having an osmolarity of from about 330 to 440, preferably about 350 mOsm. In some embodiments, the extracts have a pH of from about 5.0 to about 7.7, preferably a pH of about 6.5-7.0. In some embodiments, the extracts have a protein content of about 100 to 250 mg/ml, preferably about 160 to 190 mg/ml, and most preferably about 120 mg/ml. In some embodiments, the compositions have a water content of about 20 to 90 percent water weight/weight (w/w), preferably about 37 to 79% water w/w. In some embodiments, the extracts have a density of about 0.8 to about 1.4 g/ml, preferably about 1.1 g/ml. In some embodiments, the compositions comprise trace elements including, but not limited to, calcium, phosphorus, zinc, copper and iron. In some embodiments, the compositions comprise vitamins, including, but not limited to vitamins A, C, E, riboflavin, niacin, B 6, calcium pantothenate and B 12. In some embodiments, the present invention provides a fresh roe composition comprising: 2.7 to 3.4% protein; 3 to 5% carbohydrates; 1.0 to 1.7% fats in the form of phospholipids, and 0.01 to 0.05% minerals in fresh roe, should be less fats and higher total protein in the extract), 37 to 79 weight percent water. In some embodiments, the extracts further comprise a lipid fraction. In some embodiments, the lipid fraction comprises from about 60% to about 80% unsaturated fatty acids. In further embodiments, the compositions comprise phospholipids, including phosphatidyl cholines (lecithins) or as phosphatidyl ethanolamine (cephalins), and to a lesser extent inositol phosphatides, cerebrosides and sphingomyelins. In some embodiments, the lipid fraction is from about 0.1% to about 1%, 2%, 3%, 4% or 5% of the total composition, while in other embodiments, the compositions are substantially free or free of lipids.

In some embodiments, the eggs or extracts are treated to prevent bacterial growth. The use of a variety of methods is contemplated. In some embodiments, the following methods are combined. In some embodiments, unfertilized or fertilized eggs (e.g., fish or amphibian eggs) are treated prior to homogenization with a bactericidal or bacteriostatic agent. Preferred agents include, but are not limited to, iodine containing agents such as betadine, buffodine, and povidone-iodine, and other agents such as novasan, sodium hypochlorite, bacitracin, polymyxin B sulfate, silver containing compounds such as silver sulfadiazine and silver nitrate, mafenide acetate, nystatin, gentamicin, neomycin. In other embodiments, the extracts are treated post-homogenization to prevent bacterial growth. In some embodiments, the extracts, such as the cellular extracts or cytoplasmic fractions, are treated by heating. In some embodiments, the extracts are heated to about 37, 40, 50, 60, 70, 80 or 90 degrees Celsius for about 30 seconds or 1, 2, 5, 10, 20, 30, 60 or 120 minutes.

In some embodiments, the eggs or extracts are filtered, preferably through 0.22 or 0.45 um filters to remove bacteria. In some embodiments, before or after filtering, the extracts are treated by additional centrifugation (15 min-2 hrs) after heating the extract (to about to about 37, 40, 50, 56 60, 70, 80, 90 or 95 degrees Celsius for about 30 seconds or 1, 2, 5, 10, 20, 30, 60 or 120 minutes) to spin down any bacteria present. It has surprisingly been found that the biological activity of the extracts is retained even after aggressive heat treatment. In some embodiments, the retained biological activity is the ability to stimulate mitochondrial activity and/or the ability to increase hyaluronic acid production in skin fibroblasts.

In other embodiments, eggs are washed in a sulfur-containing agent (e.g., calcium polysulfide or calcium thiosulfate (lime sulfur)) prior to preparation. In some embodiments, sulfur is added to the extracts to remove bacteria. In other embodiments, benzoyl peroxide is added to the extracts. In some embodiments, eggs are washed in 0.001% to about 0.2% by weight of a metal chlorite and sufficient acid to adjust the pH of the solution from about 2.2 to about 4.5 to remove bacteria. In further embodiments, the eggs and/or extract are placed in a vacuum drum and mixed with a natural solution containing salt, vitamin C or citric acid, and water to remove bacteria. In some embodiments, the eggs and/or extract are stirred, vortexed, sonicated, agitated or shaken with saltwater or liquid buffer to dislodge bacteria and vacuum filter off the liquid to remove bacteria. It will be possible to check bacterial content in the liquid and on the treated eggs for quality control. In some embodiments, electrophoresis of the eggs and/or extract is used to remove bacteria. It is contemplated that such methods utilize the influences of electrical double layer, intensity of electrical field, electric density gradient, pH of the buffer solution, ionic strength of buffer solution, stage of growth of bacteria, and anion surface-active agent upon the electrophoretic mobility of some species of bacteria.

In some embodiments, lipids are removed by treatments the homogenate prior to centrifugation or the extract after centrifugation. The use of a variety of methods is contemplated. In some embodiments, lipids are removed by filtering through fat-absorbing paper or filter by applying a vacuum suction system to a container with a filter in the bottom, where the extract is placed in the container and suctioned through the filter. In some embodiments, lipids are removed by using an absorbent material and an outer containment vessel. The extract is entered to a container filled with absorbent material through a pump and then recovered by applying a vacuum. In some embodiments, lipids are removed with hollow fiber contraction systems and/or extraction solvents for removing lipids from viscous fluids, where contact a fluid with an extraction solvent, which causes the lipids in the fluid to separate from the fluid or causes lipids in the lipid-containing organisms to separate from the lipid-containing organism, using at least one hollow fiber contactor.

In some embodiments, the homogenates and extracts may be stabilized by the addition of one or more stabilizing agents, such as a lipid stabilizing agent, or by packaging in a package designed to prevent oxidation. In some embodiments, antioxidants such as vitamin E are added to the extract to reduce rate of lipid oxidation. In some embodiments, the extracts are packaged in a container under an inert atmosphere. In some embodiments, the extract is packaged to reduce rate of lipid oxidation in air-free containers such as aluminum coated bags (less than 10 kg per bag for efficient removal of oxygen), or containers filled with nitrogen to remove oxygen. In other embodiments, the extracts are packaged in vacuum packed containers with a pump delivery system.

In some embodiments where fish eggs are utilized, the fish eggs are treated to prevent bacterial growth as described above. The fish eggs are then homogenized by subjecting the fish eggs to a pressure treatment. In some embodiments, the eggs are subjected to a pressure of from about 1 ton to about 100 tons, preferably about 5 tons to about 50 tons, more preferably about 10 tons to about 30 tons and most preferably about 20 tons. In some embodiments, the pressure is applied via a hydropress. Suitable hydropresses are available from Speidel. In some embodiments, components of the homogenate are separated. In some preferred embodiments, an aqueous cytoplasmic fraction is obtained that comprises protein, DNA, RNA, and other components as described in more detail elsewhere herein. In some embodiments, the extracts comprise a lipid component in addition to the water soluble components. In some embodiments, the extract is separated from the homogenate by centrifugation. In some embodiments, the centrifugation is a continuous-feed process facilitated by a separator. Suitable separators are available, for instance, from GEA Westfalia.

In some embodiments, the cellular extracts described above, and most preferably the middle fractions, are further fractionated. A variety of method may be used, including, but not limited to, FICOL gradients, gradient centrifugation, protein precipitation, freeze drying, column chromatography, such as size exclusion chromatography and affinity chromatography, gel separation, high pressure liquid chromatography, ChIP, and immunoprecipitation. It will be recognized that these fraction steps yield corresponding fractions such as freeze dried fractions, affinity chromatography fractions, precipitated fractions, etc.

Accordingly, in some embodiments, the present invention provides powders prepared from the cellular extracts described above. In some embodiments, the cellular extracts used in the production of the powders are prepared from salmonid eggs. In some embodiments, the cellular extracts used in the production of the powders are prepared from salmon or trout eggs. In some embodiments, the powders are biologically active. In some preferred embodiments, the powders are freeze-dried. In some embodiments, the powders have less than about 10% moisture and most preferably less than about 5% moisture; protein in a concentration of from about 500 to about 800 mg/g powder, preferably from about 600 to about 700 mg/g powder, most preferably about 640 mg/g powder; DNA in a concentration of from about 1 to about 50 µl/mg powder, preferably from about 5 to about 25 µl/mg powder, and most preferably about 16 µl/mg powder; total RNA (e.g., including mRNA, rRNA, and microRNA) in a concentration of from about 1 to about 50 µl/mg powder, preferably from about 5 to about 20 µl/mg powder, and most preferably about 12 µl/mg powder; and lipids in a concentration of from about 100 to about 200 mg/g powder, most preferably about 150 mg/g powder. The powders may preferably be used to make the formulations described herein as an alternative to the non-powdered cellular extracts.

In some embodiments, the fractions are then combined with or resolubilized with components suitable for preparing compositions for topical administration as described in more detail below.

As mentioned above, the present invention is not limited to the use of any particular wound healing agent. Other suitable wound healing agents include, but are not limited to: antimicrobial polypeptides (alpha-defensins, LL37, beta-defensins, etc.); antimicrobial drugs, for example, pharmaceutically acceptable salts of β-lactam drugs, quinolone drugs, ciprofloxacin, norfloxacin, tetracycline, erythromycin, amikacin, triclosan, doxycycline, capreomycin, chlorhexidine, chlortetracycline, oxytetracycline, clindamycin, ethambutol, hexamidine isothionate, metronidazole; pentamidine, gentamycin, kanamycin, lineomycin, methacycline, methenamine, minocycline, neomycin, netilmycin, paromomycin, streptomycin, tobramycin, miconazole, and amanfadine; antimicrobial silver compositions, and the like.

In still other preferred embodiments, the recombinant enzymes described herein, including recombinant LCE and HCE, may be used to treat skin conditions and diseases. For example, the compositions may be used cosmetically as exfoliants, moisturizers or to ameliorate abnormal skin pigmentation such as liver, age, sun or brown spots. In some preferred embodiments, the recombinant enzyme may be provided in a suitable cosmetic or pharmaceutical formulation as described below. Diseases and conditions which may be treated with the recombinant enzymes and formulations described herein include dry skin, hyperkeratosis, calluses, warts, liver spots, age spots, stretch marks, sunspots, brown spots, acne, eczema and psoriasis.

C. Formulations and Devices

In some embodiments, the active agents described above (i.e., the debridement enzyme such as LCE or HCE and/or the wound healing agent) are formulated for delivery by a variety of methods. In some embodiments, the extracts described above are formulated for delivery to skin, gastrointestinal tract, fat deposits, cartilage, bone, connective tissue, muscle or internal organs. In some embodiments, the active agents described above are formulated for topical delivery. General formulations for topical delivery are described in Remington's Pharmaceutical Sciences, 18th Edition, Mack Publishing, p. 1288-1300 [1990]. In accordance with the compositions and method of the present invention, the active agents of the present invention may be administered in the form of a pharmaceutical composition additionally comprising a pharmaceutically acceptable carrier. One skilled in the art will appreciate that suitable methods of administering the extract compositions to an animal, such as a mammal, are available and, although more than one method can be used to administer a particular composition, a particular method and dosage can provide a more immediate and more effective reaction than others. Pharmaceutically acceptable carriers are also well known to those skilled in the art. The choice of carrier will be determined, in part, both by the particular composition and by the particular method used to administer the composition. Accordingly, there is a wide variety of suitable formulations of the pharmaceutical compositions of the present invention.

In some preferred embodiments, the formulations of this invention are designed for topical administration. Typical of such formulations are sprays, ointments, creams, and gels.

Accordingly, in some preferred embodiments, the recombinant LCE or HCE enzymes described herein are provided in pharmaceutical or cosmetic formulations. In some preferred embodiments, formulations comprise one or more pharmaceutically or cosmetically acceptable excipients and/or diluents. In some preferred embodiments, formulations are a gel, cream, ointment, lotion, foam, non-aqueous solution, spray, salve, stick, soap, powder, film, emulsion, suspension or dispersion.

Ointments generally are prepared using either (1) an oleaginous base, i.e., one consisting of fixed oils or hydrocarbons, such as white petrolatum or mineral oil, or (2) an absorbent base, i.e., one consisting of an anhydrous substance or substances which can absorb water, for example, anhydrous lanolin. Customarily, following formation of the base, whether oleaginous or absorbent, the active ingredient (e.g., salmon egg extract) is added in an amount affording the desired concentration.

Creams are oil/water emulsions. They consist of an oil phase (internal phase), comprising typically fixed oils, hydrocarbons, and the like, such as waxes, petrolatum, mineral oil, and the like, and an aqueous phase (continuous phase), comprising water and any water-soluble substances, such as added salts. The two phases are stabilized by use of an emulsifying agent, for example, a surface active agent, such as sodium lauryl sulfate; hydrophilic colloids, such as acacia colloidal clays, veegum, and the like. Upon formation of the emulsion, the active ingredient (e.g., salmon egg extract) customarily is added in an amount to achieve the desired concentration.

Gels comprise a base selected from an oleaginous base, water, or an emulsion-suspension base, such as described above. To the base is added a gelling agent which forms a matrix in the base, increasing its viscosity. Examples of gelling agents are hydroxypropyl cellulose, acrylic acid polymers, and the like. Customarily, the active ingredient (IGF-II) is added to the formulation at the desired concentration at a point preceding addition of the gelling agent.

Serums may be watery or thicker liquids, often (but not always) clear in color. Serums are water based making them light in consistency. They are easily and quickly absorbed into the skin and provide an excellent way to deliver topical ingredients including Vitamin C, peptides, alpha hydroxy acids, retinols. Serums may be layered under other serums as well as creams or lotions making them a very flexible product to incorporate into your skin care regimen. Serums are tolerated well by all skin types as long as the individual is not sensitive to any of the ingredients. Serums may include glycerol or glycerine. The amount of extract incorporated into the formulation of this invention is not critical; the concentration should only be in a range sufficient to permit ready application of the formulation to the wound area in an amount which will deliver the desired amount of extract.

Sprays preferably include both aerosol and pump spray formulations.

The present invention may be formulated as necessary with additives used commonly in the pharmaceutical sciences, such as surfactants, oils and fats, polyhydric alcohols, lower alcohols, thickening agents, UV absorbents, light scattering agents, preservatives, antioxidants, antibiotics, chelating agents, pH regulators, flavoring agents, pigments and water.

Examples of surfactants include polyoxyethylene (hereinafter abbreviated as POE-branched alkyl ethers such as POE-octyldodecyl alcohol and POE-2-decyltetradecyl alcohol, POE-alkyl ethers such as POE-oleyl alcohol ether and POE-cetyl alcohol ether, sorbitan esters such as sorbitan monooleate, sorbitan monoisostearate and sorbitan monolaurate, POE-sorbitan esters such as POE-sorbitan monooleate, POE-sorbitan monoisostearate and POE-sorbitan monolaurate, fatty acid esters of glycerol such as glyceryl monooleate, glyceryl monostearate and glyceryl monomyristate, POE-fatty acid esters of glycerol such as POE-glyceryl monooleate, POE-glyceryl monostearate and POE-glyceryl monomyristate, POE-dihydrocholesterol ester, POE-hardened *castor* oil, POE-hardened *castor* oil fatty acid esters such as POE-hardened *castor* oil isostearate, POE-alkylaryl ethers such as POE-octylphenol ether, glycerol esters such as glycerol monoisostearate and glycerol monomyristate, POE-glycerol ethers such as POE-glycerol monoisostearate and POE-glycerol monomyristate, polyglycerol fatty acid esters such as diglyceryl monostearate, decaglyceryl decastearate, decaglyceryl decaisostearate and diglyceryl diisostearate and other nonionic surfactants; potassium salts, sodium salts, diethanolamine salts, triethanolamine salts, amino acid salts and other salts of higher fatty acids such as myristic acid, stearic acid, palmitic acid, behenic acid, isostearic acid and oleic acid, the above alkali salts of ether carboxylic acids, salts of N-acylamino acids, N-acylsalconates, higher alkylsulfonates and other anionic surfactants; alkylamine salts, polyamine, aminoalcohol fatty acids, organic silicone resin, alkyl quaternary ammonium salts and other cationic surfactants; and lecithin, betaine derivatives and other amphoteric surfactants.

Examples of oils and fats include vegetable oils and fats such as *castor*-oil, olive oil, *cacao* oil, *camellia* oil, coconut oil, wood wax, jojoba oil, grape seed oil and avocado oil; animal oils and fats such as mink oil and egg yolk oil; waxes such as beeswax, whale wax, lanolin, carnauba wax and candelilla wax; hydrocarbons such as liquid paraffin, squalene, microcrystalline wax, ceresine wax, paraffin wax and vaseline; natural or synthetic fatty acids such as lauric acid, myristic acid, stearic acid, oleic acid, isostearic acid and behenic acid; natural or higher alcohols such as cetanol, stearyl alcohol, hexyldecanol, octyldecanol and lauryl alcohol; and esters such as isopropyl myristate, isopropyl palmitate, octyldodecyl myristate, octyldodecyl oleate and cholesterol oleate.

Examples of polyhydric alcohols include ethylene glycol, polyethylene glycol, propylene glycol, 1,3-butyrene glycol, 1,4-butyrene glycol, dipropylene glycol, glycerol, digylcerol, triglycerol, tetraglycerol and other polyglycerols, glucose, maltose, maltitose, sucrose, fructose, xylitose, sorbitol, maltotriose, threitol and erythritol.

Examples of thickening agents include naturally-occurring high molecular substances such as sodium alginate, xanthene gum, aluminum silicate, quince seed extract, gum tragacanth, starch, collagen and sodium hyaluronate; semi-synthetic high molecular substances such as methyl cellulose, hydroxyethyl cellulose, carboxymethyl cellulose, soluble starch and cationized cellulose; and synthetic high molecular substances such as carboxyvinyl polymer and polyvinyl alcohol.

Examples of UV absorbents include p-aminobenzoic acid, 2-ethoxyethyl p-methoxycinnamate, isopropyl p-methoxycinnamate, butylmethoxybenzoylmethane, glyceryl-mono-2-ethylhexanoyl-di-p-methoxybenzophenone, digalloyl trioleate, 2,2'-dihydroxy-4-methoxybenzophenone, ethyl-4-bishydroxypropylaminobenzoate, 2-ethylhexyl-2-cyano-3,3'-diphenyl acrylate, ethylhexyl p-methoxycinnamate, 2-ethylhexyl salicylate, glyceryl p-aminobenzoate, homomethyl salicylate, methyl o-aminobenzoate, 2-hydroxy-4-methoxybenzophenone, amyl p-dimethylaminobenzoate, 2-phenylbenzoimidazole-5-sulfonic acid and 2-hydroxy-4-methoxybenzophenone-5-sulfonic acid.

Examples of preservatives include benzoates, salicylates, sorbates, dehydroacetates, p-oxybenzoates, 2,4,4'-trichloro-2'-hydroxydiphenyl ether, 3,4,4'-trichlorocarbanilide, benzalkonium chloride, hinokitiol, resorcinol and ethanol.

Examples of antioxidants include tocopherol, ascorbic acid, butylhydroxyanisole, dibutylhydroxytoluene, nordihydroguaiaretic acid and propyl gallate.

Examples of chelating agents include sodium edetate and sodium citrate.

Examples of antibiotics include penicillin, neomycin, cephalothin, potassium permanganate, selenium sulfide, erythromycin, bacitracin, tethacyclin, chloramphenicol, vancomycin, nitrofurantoin, acrisorcin, chlorodontoin, and flucytosine.

Some of these additives function to enhance the efficacy of the composition by increasing the stability or percutaneous absorbability of the essential components of the present invention.

Also, any dosage form is acceptable, whether in solution, emulsion, powder dispersion, or others. Applicability is wide, including fundamental dosage forms such as lotions, emulsions, creams and gels.

In addition to those stated above, suitable vehicles, carriers and adjuvants include water, vaseline, petrolatum, mineral oil, vegetable oil, animal oil, organic and inorganic waxes, polymers such as xanthanes, gelatin, cellulose, collagen, starch, kaolin, carrageenan, gum arabic, synthetic polymers, alcohols, polyols, and the like. The carrier can also include sustained release carrier such as lypizomes, microsponges, microspheres, or microcapsules, aqueous base ointments, water in oil or oil in water emulsions, gels or the like.

In addition to inclusion in topical delivery formulations, the active agents described above may be included in devices such as wound dressings and coverings, adhesive bandages, wound pads, dermal patches and similar devices. For example, example, the active agents may be included in one or more layers in such a device so that the active agents may be released from the device and into the wound bed. Accordingly, in some embodiments, the active agents may be incorporated into a wound dressing or biologic wound dressing that is compatible with functionalization. Examples of commercially available wound dressings that can be modified by addition of the active agents of the present invention, but are not limited to, Biobrane™, gauze, adhesive tape, bandages such as Band-Aids®, and other commercially available wound dressings including but not limited to COMPEEL®, DUODERM™, TAGADERM™, and OPSITE®.

EXAMPLES

Example 1

Recombinant Trout LCE Production

The ORF coding for Trout Choriolysin (LCE1) was cloned into pMAL-c4x. Such a design fused an amino terminal maltose binding protein to a 8× histidine tag to a TEV protease site, which was cloned amino terminal to LCE1. The expression construct was transformed into Rosetta(DE3)pLysS under ampicillin selection. The resultant strain was termed Rosetta(DE3)pLysS/MBP_LCE1. ExpressionA single colony of Rosetta(DE3)pLysS/MBP_LCE1 was grown in 3 ml LBAMP100 overnight with vigorous shaking at 37° C. Overnight growth was subcultured at a 1/125 ratio into 25 ml of LBAMP100. When these cultures reached a density of A600 between 0.3 and 0.5 an uninduced sample was taken and cultures were induced with 0.5 mM IPTG. After 4 hours at shaking at 37° C., an induced sample was taken. Uninduced and Induced samples were resolved on 10% SDS-PAGE and stained with coomassie brilliant blue. The gel was destained and imaged (FIG. 1).

Example 2

Protease Activity Measurements of Recombinant LCE1

Figure 2:
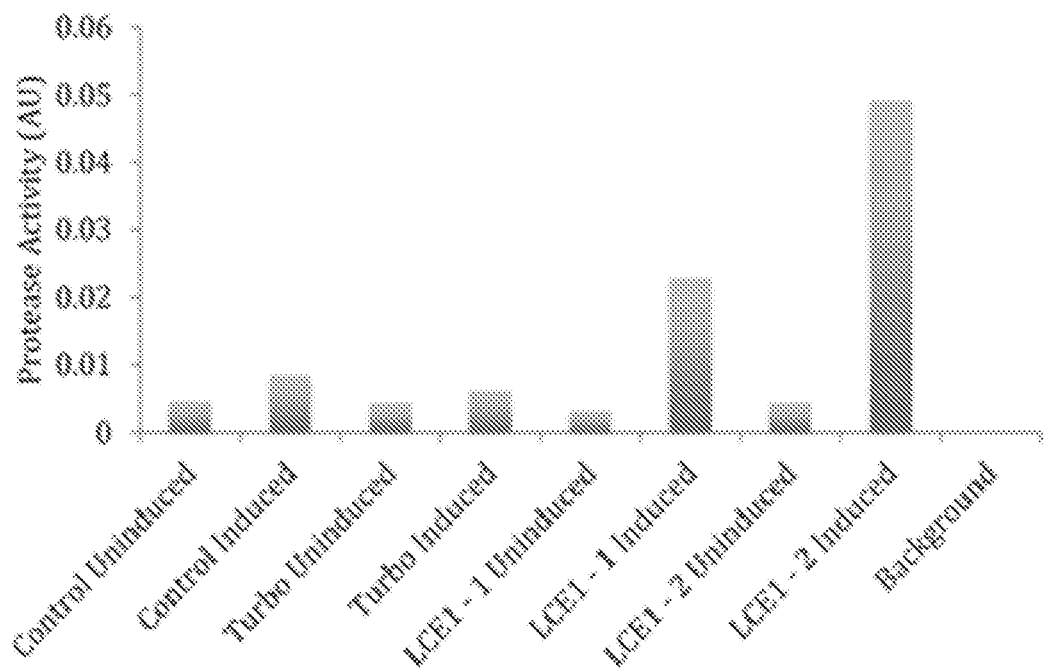
FIG. 2. Protease activity of fractions from recombinant LCE1 overexpression.
Figure 3:
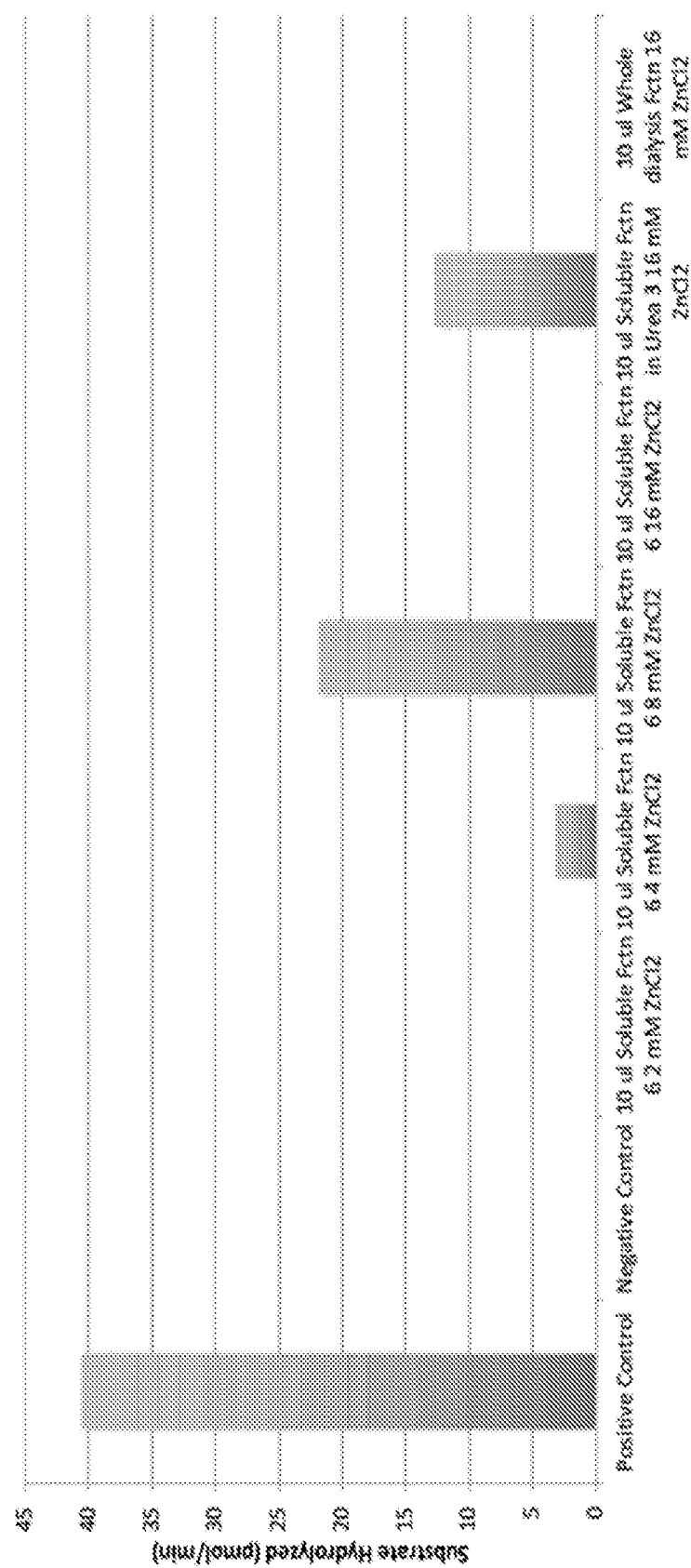
FIG. 3. Soluble recombinant LCE activity with addition of urea and zinc chloride.

Samples collected as described in Example 1 were analyzed for the presence of active protease. Samples were aliquoted into 20 µl equivalent fractions, as determined by bacterial cell density. 20 µg lysozyme was added to each aliquot and incubated for at least 30 minutes at room temperature. Protease activity of the expressed LCE was measured in an assay using fluorescein isothiocyanate (FITC)-labeled casein as a general protease substrate. The fluorescein label on the FITC-Casein is highly quenched. Upon digestion by LCE1 present in the sample the FITC-Casein substrate is cleaved into smaller peptides which abolishes the quenching of the fluorescence label. The fluorescence of the FITC-labeled peptide fragments is measured at Ex/Em=485/530 nm. Mass Spectrometry Grade (MSG), chemically stabilized Trypsin is used as a general protease control. Results are presented in FIGS. 2 and 3. As can be seen, the activity of soluble LCE was improved by the addition urea and zinc chloride (FIG. 3).

Example 3

Preparation of Fish Egg Extracts

Fresh, unfertilized salmon (*Salmo salar*) eggs harvested from females in reproductive phase (late fall) are kept on ice, and the extract preferably made immediately. It is possible to freeze dry eggs in a cryoprotectant (e.g., 1.5 M 1,2- propanediol and 0.2 M sucrose) without disrupting the egg membrane. Freezing should be gradual (−1° C./min) to −80° C. Eggs should be thawed and kept on ice throughout the extract preparation procedure.

Eggs are washed twice in HBSS or seawater with protease inhibitors (10 ug/ml). The washing solution is removed and the eggs are lysed and homogenized in a pre-chilled Dounce glass-glass homogenizator. The lysate is transferred to Beckman Ultra Clear polyallomer centrifuge tubes (5 ml) while avoiding transfer of egg shells, and centrifugated for 15 min at 15.000 g at 4° C. in a Beckman ultracentrifuge using SW55T1 rotor. Three fractions are thereby obtained; lipid top fraction, cytoplasmic middle fraction, and a bottom fraction containing eggshells and nucleic debris. The cytoplasmic middle fraction is the collected extract. This extract is expected to contain most cytosolic organelles including mitochondria, lysosomes and peroxisomes, should be clear and viscous, and have an orange tint. Protease inhibitors (10 ug/ml stock) are added and extracts are kept at −80° C.

Further fractionation of the cytoplasmic extract is possible. Centrifugation at 100,000 g at 4° C. for 60 minutes yields 2-3 fractions, where the top/middle cytoplasmic fraction contains the cytosol with endoplasmic reticulum, SV and microsomes. The extract pH is measured by litmus paper, protein concentration measured by Bradford assay, and osmolarity measured by osmometer.

Mid-blastula Zebra fish embryos are collected, liquid removed and frozen to −20° C. To prepare the extract, embryos are thawed on ice, lysed and homogenized by Dounce glass-glass homogenizator in a small amount of either HBSS or seawater (preferably less than 50% liquid v/v). The lysate is filtered through a sterile linen cloth and centrifugated at 5,000 g at 4° C. for 20 minutes in a SX4250 rotor using a Beckman X-22R centrifuge. The cytoplasmic extract (supernatant) is collected and protease inhibitors (10 ug/ml) are added. The extract may be Millipore filtered (0.22 um MilliQ sterile filter). The extracts are kept at −80° C. The extract pH is measured by litmus paper, protein concentration measured by Bradford assay, and osmolarity measured by osmometer.

This general procedure is useful for the preparation of extracts from sea urchin, shrimp, fish eggs/roe or frog eggs. Briefly, roe collected from gravid female fish soon after they liberated their eggs in a spawning program (hCG hormone injected (1 ml/kg) at 6 to 8 hours before egg liberation, usually at dawn (2-4 am), or from gravid frogs. Roe/eggs are freeze dried or frozen at −20° C. or used fresh. Roe is collected from different kinds of fish. For sea-urchin, 0.5 M KCl is injected around the mouth to evoke shedding of eggs. The extract is prepared from eggs/roe by crushing (cell cracker or dounce-homogenization) or centrifugation at different speeds to separate cytoplasm with all content, with/without eggshells (zona pellucida), with/without nucleus/cytosol, with/without organelles, with/without lipids. Further fractionation can be conducted to isolate one or more of mRNA, proteins, small peptides, carbohydrates and lipids. Major components of fatty acids in the roe are oleic acid, linoleic acid, and omega-3 fatty acids.

Upon application of the above protocol for salmon egg extracts, the salmon egg extracts had a surprisingly high protein concentration varying from 100-380 mg/ml, pH between 6.4-6.8, and an osmolarity of approximately 350 mOsm. The extracts were clear and viscous and non-filterable (by 0.45 um MilliQ filter). The protein in the extract precipitated easily upon addition of water or hydrous solutions with low buffering capacity due to the high protein content and low pH. Extracts could be neutralized to pH 7.0 by addition of alkaline (1-3 ul 1 M NaOH/ml extract), whereupon dilution in water and hydrous solutions was possible. Zebra-fish extracts had a protein concentration varying from 23-26 mg/ml, pH between 6.4-6.8, and an osmolarity between 80-150 mOsm. The extracts were clear and non-viscous, filterable and diluted readily in water at all dilutions.

Physical properties of various fish egg extracts, including RNA, DNA and protein content, made by these methods were further assessed using the Qube-iT fluorimeter from InVitrogen.

Homogenates of salmon eggs (non-centrifugated) contain 3-4 mg/ml RNA. After centrifugation to 9-15,000 g, RNA content was reduced to 2-3 mg/ml. This is probably due to RNA being centrifugated down or degraded. Interestingly, trout egg homogenates (non-centrifugated) contain 2-3 mg/ml RNA, but after centrifugation to 9-15,000 g, the concentration of RNA sis increased to 3-5 mg/ml. Extracts made from trout eggs are less viscous than extracts made from salmon eggs, and may keep RNA better in water phase suspension during centrifugation.

Homogenates of salmon eggs (non-centrifugated) contain 60-200 ug/ml DNA After centrifugation to 9-15,000 g, DNA content was reduced to 40-51 ug/ml. This is probably due to DNA being centrifugated down. Interestingly, homogenates of trout eggs (non-centrifugated) contain more DNA than salmon egg extracts: 130-530 ug/ml DNA. After centrifugation to 9-15,000 g, DNA content is reduced to 70-125 ug/ml, but is still higher than comparable salmon egg extracts. Extracts made from trout eggs are less viscous than extracts made from salmon eggs, and may keep DNA in better water phase suspension during centrifugation.

Homogenates of salmon eggs (non-centrifugated) contain 180-260 mg/ml protein. After centrifugation to 9-15,000 g, protein content was unchanged or increased slightly to 200-260 mg/ml. Homogenates of trout eggs (non-centrifugated) contain 250-300 mg/ml protein, and after centrifugation to 9-15,000 g, protein content is roughly the same (250-270 mg/ml). The protein fraction of the egg cytosol is not expected to be spun down at the g-forces applied, and may be expected to be similar to the raw protein content of the egg cytosol.

Previous measurements of protein contents in extracts using a Nano-drop spectrophotometer showed a range of 150-250 mg/ml. This may be due to an upper detection limit around 250 mg/ml in the Nano-drop. It is probable that the slightly higher fluorometer measurements presented here are more accurate.

TABLE 1

Summary of measurements RNA, DNA and protein content in extracts

| Source of eggs | Centrifugation speed | LEX/corresp to LEX | mg/ml RNA | µg/ml DNA | mg/ml protein |
|---|---|---|---|---|---|
| Salmon | Homogenate, no centrifugation | LEX20 | 3.51 | 66.8 | 256 |
| Salmon | 15000 xg | LEX20 | 2.34 | 44 | 252 |
| Salmon | Homogenate, no centrifugation | LEX24 | 3.42 | 192.4 | 180 |
| Salmon | 12000 xg | LEX24 | 2.93 | 50.8 | 208 |
| Trout | Homogenate, no centrifugation | LEX28 | 2.67 | 131.6 | 249 |

TABLE 1-continued

Summary of measurements RNA, DNA and protein content in extracts

| Source of eggs | Centrifugation speed | LEX/corresp to LEX | mg/ml RNA | µg/ml DNA | mg/ml protein |
|---|---|---|---|---|---|
| Trout | 15000 xg | LEX28 | 3.51 | 73.2 | 249 |
| Trout | Homogenate, no centrifugation | LEX25 | 2.53 | 528 | 296 |
| Trout | 15000 xg | LEX25 | 3.70 | 72.8 | 262 |
| Trout | 15000 xg | LEX25 | 3.63 | 99.2 | 210 |
| Trout | 12000 xg | LEX31 | 4.59 | 87.2 | 270 |
| Trout | 12000 xg | LEX32 | 4.68 | 124.8 | — |
| Trout | 12000 xg | LEX33 | 4.67 | 94.4 | 252 |

The lipid content of extracts were measured by ALS (Germany), and was found to be in the narrow range of 3.7-4.5 g/100 g in all extracts from salmon or trout roe prepared at centrifugations spanning from 1,700 g to 15,000 g. The lower g-force centrifugations appear to require spinning at room temperature to give equal lipid fractionation to higher g-forces at 4 degrees centigrade. At lower centrifugal forces than 1,700 g also applicable to produce an extract the lipid content may be higher (4-7%). The extract may contain the following lipids (right column), and the lipid fraction removed from the extract during production may include the following lipids (left column)

TABLE 2

Lipid content can vary beetween batch production and specific lipids can include:

| Report by ALS Scandinavia ELEMENT | SAM-PLE | Removed from extract LIPID lipid fract. | % of remaining lipids in extract LEX 42 |
|---|---|---|---|
| Fatty acids, saturated | g/100 g | 22.7 | 1.6 |
| Fatty acids, monounsaturated | g/100 g | 36.6 | 2.8 |
| Fatty acids, polyunsaturated | g/100 g | 44.5 | 0.8 |
| C4:0 Butyric acid | g/100 g | <0.10 | <0.10 |
| C6:0 Caproic acid | g/100 g | <0.10 | <0.10 |
| C8:0 Caprylic acid | g/100 g | <0.10 | 0.25 |
| C10:0 Capric acid | g/100 g | <0.10 | 0.62 |
| C11:0 Undecanoic acid | g/100 g | <0.10 | <0.10 |
| C12:0 Lauric acid | g/100 g | <0.10 | <0.10 |
| C13:0 Tridecanoic acid | g/100 g | <0.10 | <0.10 |
| C14:0 Myristic acid | g/100 g | 3 | 4.2 |
| C14:1 Myristoleic acid | g/100 g | 0.11 | 0.15 |
| C15:0 Pentadecanoic acid | g/100 g | 0.3 | 0.34 |
| C15:1 cis10-Pentadecanoic acid | g/100 g | <0.10 | 0.12 |
| C16:0 Palmitic acid | g/100 g | 11 | 14.3 |
| C16:1 Palmitoleic acid | g/100 g | 7.3 | 9.6 |
| C17:0 Heptadecanoic acid | g/100 g | 0.24 | 0.21 |
| C17:1 Heptadecenoic acid | g/100 g | <0.10 | <0.10 |
| C18:0 Stearic acid | g/100 g | 3.6 | 5.4 |
| C18:1 Oleic acid | g/100 g | 22.9 | 33.8 |
| C18:2 Linoleic acid (omega6) | g/100 g | 6.2 | 5 |
| C18:3 Linolenic acid(omega6) | g/100 g | 0.92 | 0.47 |
| C18:3 a-Linolenic acid(omega3) | g/100 g | 2.4 | <0.10 |
| C18:4 Stearidonic acid (ome3) | g/100 g | 0.57 | 0.23 |
| C20:0 Arachidic acid | g/100 g | 0.85 | 0.43 |
| C20:1 Eicosenoic acid | g/100 g | 0.83 | 1.1 |
| C20:2 Eicosadienoic acid (om6) | g/100 g | 0.49 | 0.34 |
| C20:3Eicosatrienoic ac(omega6) | g/100 g | 0.3 | 0.14 |
| C20:4 Arachidonic acid(omega6) | g/100 g | 1.6 | 0.78 |
| C20:5Eicosapentaenoic ac(ome3) | g/100 g | 9.4 | 2.8 |
| C21:0 Heneicosanoic acid | g/100 g | <0.10 | <0.10 |
| C22:0 Behenic acid | g/100 g | 3.1 | 1.3 |
| C22:1 Erucic acid | g/100 g | <0.10 | <0.10 |
| C22:2 Docosadienoic ac (ome6) | g/100 g | <0.10 | <0.10 |
| C22:5 Docosapentaenoic ac(ome3 | g/100 g | 6.8 | 2.3 |
| C22:6 Docosahexaenoic ac(ome3) | g/100 g | 13.5 | <0.10 |

TABLE 2-continued

Lipid content can vary beetween batch production and specific lipids can include:

| Report by ALS Scandinavia ELEMENT | SAM-PLE | Removed from extract LIPID lipid fract. | % of remaining lipids in extract LEX 42 |
|---|---|---|---|
| C24:0 Lignoceric acid | g/100 g | <0.10 | <0.10 |
| C24:1 Nervonic acid | g/100 g | <0.10 | 2.6 |
| Vanninnhold (water) | g/100 g | | 65.9 |

Example 4

Production of Extracts

As described in Example 1, the lipid content of the extract surprisingly is unchanged at centrifugation speeds varying from 1,700 g to 15,000 g (see above), while other parameters such as RNA, DNA and protein content is altered with the increase of g-force during centrifugation. An extract may also be produced by lower centrifugal forces, down to 400 g, whereupon the content of especially lipids may be higher.

An extra step of washing the eggs for 10 minutes with buffodine (1:100 in 0.9% NaCl) before preparation of homogenate is beneficial. This washing step appears to reduce the bacterial content significantly. For safety reasons, all LEX batches packaged in final containers are mildly pasteurized (incubated) by heating to 56° C. for 20 minutes. This pasteurization sterilizes the extract completely, with 0 bacteria found in extracts plated on bacteria dishes incubated for 3 days at room temperature, 4 degrees centigrade or 30 degrees centigrade. 1 colony/100 ul LEX plated on agar dish incubated at room temperature is the maximum observed. This is 100× below safety limits for drinking water (100 bacteria/ml). A single colony seldom observed probably comes from the air during the plating of LEX, and is comparable to bacterial growth of negative control (plate only).

The stability of LEX and collagen secretion effect is retained after LEX is heated to 56° C. for 20 minutes. When applied to human fibroblasts in vitro at 0.5% concentration in cell media for 8 days (media changed daily), the effect on collagen secretion (as measured as efflux of collagen from cells to cell medium and compared to untreated control cells), was comparable to cells treated with unheated extract which had been kept at −80° C. after preparation. A 200-400% increase compared to controls was observed for both heated and unheated LEX.

Heat treated LEX (HEX) is produced from salmon egg extract (LEX) prepared as described above. For HTX, the Salmon egg extract was tenfold diluted (1:10) in sterile 1×PBS buffer; 0.5 ml aliquots were prepared. All samples were heated at 95° C. for five minutes, cooled down and then centrifuged at 12,100×g for 2 min. The supernatant were collected, and the samples were labeled and stored at −80° C. until usage.

What is claimed is:

1. A method of debriding a wound comprising contacting the wound with an effective amount of a metalloprotease, wherein the metalloprotease is selected from the group consisting of a low choriolytic enzyme (LCE), a high choriolytic enzyme (HCE) and combinations thereof.

2. The method of claim 1, wherein the effective amount of a metalloprotease is effective to remove devitalized tissue in the wound.

3. The method of claim 1, wherein the metalloprotease is a LCE.

4. The method of claim 3, wherein the LCE is at least 90% identical to SEQ ID NO:1 and has LCE activity.

5. The method of claim 3, wherein the LCE is recombinant LCE.

6. The method of claim 1, wherein the metalloprotease is provided in a matrix, bandage, wound covering, cream, gel, emulsion, ointment, spray, powder or lotion.

7. The method of claim 1, further comprising the step of applying a wound healing agent to the wound after debridement.

8. The method of claim 7, wherein the wound healing agent is provided in a matrix, bandage, wound covering, cream, gel, emulsion, ointment, spray, powder or lotion.

9. The method of claim 7, wherein the wound healing agent comprises an extract of differentiable cells.

10. The method of claim 9, wherein the extract of differentiable cells is a fish egg extract.

11. The method of claim 10, wherein the fish egg extract is a salmon egg extract.

12. The method of claim 10, wherein the fish egg extract comprises about 100 to 380 mg/ml protein in an aqueous solution; about 0.1 to 10 mg/ml RNA; and about 0.1 to 5 mg/ml DNA and 0.1-10% lipids w/w.

13. The method of claim 12, wherein the fish egg extract is heat treated by heating the extract to greater than 90° C.

14. The method of claim 1, wherein the wound is chronic wound.

15. The method of claim 14, wherein the chronic wound is a diabetic ulcer.

16. A kit or system for treating a wound comprising:
   a first container comprising a metalloprotease in an amount effective to remove devitalized tissue from a wound, wherein the metalloprotease is selected from the group consisting of a low choriolytic enzyme (LCE), a high choriolytic enzyme (HCE) and combinations thereof; and
   a second container comprising a wound healing agent.

17. A pharmaceutical or cosmetic composition comprising:
   a recombinant low choriolytic enzyme (LCE) that is at least 90% identical to SEQ ID NO:1 and has LCE activity; and
   one or more pharmaceutically or cosmetically acceptable excipients and/or diluents,
   wherein the composition is a gel, cream, ointment, lotion, foam, non-aqueous solution, spray, salve, stick, soap, powder, film, emulsion, suspension or dispersion and
   wherein the recombinant LCE exhibits metalloprotease activity in an in vitro assay.

* * * * *

SEQUENCE LISTING

<160> NUMBER OF SEQ ID NOS: 1

<210> SEQ ID NO 1
<211> LENGTH: 261
<212> TYPE: PRT
<213> ORGANISM: Artificial
<220> FEATURE:
<223> OTHER INFORMATION: synthetic

<400> SEQUENCE: 1

```
Met Asp His Arg Pro Pro Leu Ser Leu Leu Leu Leu Leu Leu Gly
1               5                   10                  15

Leu Ser Gln Ala Ser Gly Asn Glu Ile His Asp Glu Leu Asp His Val
                20                  25                  30

Ser Ile Thr Ser Thr Ile Leu Val Ser Asn Asn Gly Thr Asn Glu Leu
            35                  40                  45

Leu Leu Glu Gly Asp Ile Leu Ala Pro Arg Thr Arg Asn Ala Met Lys
        50                  55                  60

Cys Phe Ser Ser Gln Tyr Ser Cys Leu Trp Arg Lys Ser Ile Asp Gly
65                  70                  75                  80

Leu Val Tyr Val Pro Tyr Ile Leu Ser Ala Val Tyr Ser Ser Leu Glu
                85                  90                  95

Val Glu Thr Ile Glu Thr Ser Met Lys Tyr Phe His Gly Lys Thr Cys
            100                 105                 110

Ile Arg Phe Ile Pro Arg Arg Arg Gln Thr Ala Tyr Leu Asp Ile Gln
            115                 120                 125

Ser Ser Gly Gly Cys Phe Ser Ser Met Gly Thr Val Gly Asp Arg Gln
    130                 135                 140

Thr Leu Ser Leu Ala Gln Phe Gly Cys Val Gln His Gly Ile Ile Gln
145                 150                 155                 160

His Glu Leu Leu His Ser Leu Gly Phe His His Glu His Asn Arg Ser
                165                 170                 175

Asp Arg Asp Gln Tyr Ile Arg Ile Asn Trp Gln Tyr Ile Tyr Asn Tyr
            180                 185                 190

Ala Val Glu Asn Phe Gln Lys Gln Asp Thr Asn Asn Leu Asn Thr Ala
        195                 200                 205

Tyr Asp Tyr Ser Ser Val Met His Tyr Asp Arg Thr Ala Phe Thr Asn
    210                 215                 220

Asn Tyr Gly Lys Glu Thr Ile Thr Pro Val Pro Asp Pro Ser Val Ala
225                 230                 235                 240

Ile Gly Gln Arg Gln Gly Met Ser Asp Ile Asp Val Leu Arg Val Asn
                245                 250                 255

Lys Leu Tyr Gln Cys
                260
```